(12) United States Patent
Uchida

(10) Patent No.: US 6,479,906 B2
(45) Date of Patent: Nov. 12, 2002

(54) DRIVE FORCE CONTROL SYSTEM FOR VEHICLES

(75) Inventor: Masaaki Uchida, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/862,444

(22) Filed: May 23, 2001

(65) Prior Publication Data

US 2002/0010538 A1 Jan. 24, 2002

(30) Foreign Application Priority Data

Jun. 9, 2000 (JP) ........................................ 2000-173576

(51) Int. Cl.[7] ............................................... F02N 11/06
(52) U.S. Cl. .................. 290/40 C; 290/40 F; 180/65.2; 180/65.3; 180/65.4; 320/16
(58) Field of Search ............................ 290/40 C, 40 R, 290/40 F; 180/65.2, 65.4, 65.3; 322/16

(56) References Cited

U.S. PATENT DOCUMENTS

| | | | | | |
|---|---|---|---|---|---|
| 4,953,646 | A | * | 9/1990 | Kim .............................. | 180/65.4 |
| 5,164,903 | A | * | 11/1992 | Lin et al. ..................... | 180/197 |
| 5,586,613 | A | * | 12/1996 | Ehsani ...................... | 180/65.2 |
| 5,701,062 | A | * | 12/1997 | Barrett ................. | 123/DIG. 8 |
| 5,907,191 | A | * | 5/1999 | Sasaki et al. ................. | 290/16 |
| 5,927,417 | A | * | 7/1999 | Brunner et al. ............. | 180/374 |
| 5,936,312 | A | * | 8/1999 | Koide et al. ............... | 290/38 R |
| 6,065,565 | A | * | 5/2000 | Puszkiewicz et al. ....... | 182/148 |
| 6,087,734 | A | * | 7/2000 | Maeda et al. .............. | 180/65.2 |
| 6,205,379 | B1 | | 3/2001 | Morisawa et al. | |
| 6,278,195 | B1 | * | 8/2001 | Yamaguchi et al. ...... | 290/40 A |

FOREIGN PATENT DOCUMENTS

| | | | |
|---|---|---|---|
| DE | 19941879 | | 3/2000 |
| EP | 0775607 | | 5/1997 |
| EP | 0965475 | | 12/1999 |
| GB | 2322345 | A * | 8/1998 |
| GB | 2342631 | | 4/2000 |
| GB | 2358163 | A * | 7/2001 |
| JP | 819113 | A * | 1/1996 |
| JP | 11234808 | A * | 8/1999 |
| JP | 11318001 | A * | 11/1999 |
| JP | 11-348603 | | 12/1999 |

* cited by examiner

Primary Examiner—Joseph Waks
(74) Attorney, Agent, or Firm—Foley & Lardner

(57) ABSTRACT

A controller 41 controls the torque of a front wheel drive motor 22 and a rear wheel drive motor 23, the rotation speed of a generator 21, and the torque of an engine 1. The controller 41 computes a target drive force tFv of a vehicle based on an accelerator pedal depression amount APS and a vehicle speed VSP, and divides this tFv into a target drive force tFf for the front wheels, and a target drive force tFr for the rear wheels. A power tPg required to drive the generator 21 is computed based on the target vehicle drive force tFv, and a target rotation speed tNg of the generator is computed based on this and the vehicle speed VSP. A target torque of the engine is computed from tNg and tPg.

10 Claims, 3 Drawing Sheets

DRIVE FORCE CONTROL SYSTEM FOR VEHICLES

FIELD OF THE INVENTION

The present invention relates to a vehicle comprising an internal combustion engine, a motor, and a generator, and especially to control of drive force in such a vehicle.

BACKGROUND OF THE INVENTION

In order to improve exhaust gas emission and fuel-cost performance, JP-A-H11-348603 published by the Japanese Patent Office in 1999 discloses a technique wherein a motor-generator and a continuously variable transmission are combined with an engine, and the output of the motor-generator and the output of the engine are controlled according to a running state or a battery state.

SUMMARY OF THE INVENTION

However, in vehicles having the above-mentioned drive system, there is little change of engine rotation speed during transient states such as acceleration, etc., and therefore a strange feeling may be given to the driver. Moreover, control of the motor-generator and the transmission is required, the equipment is complex and cost increase cannot be avoided.

The Applicant is carrying out research on a drive force control device for vehicles wherein a generator connected to the engine, and a motor connected to the drive wheel are made to function as a transmission. This device varies the engine rotation speed (=generator rotation speed) according to the running state of the vehicle so as not to impart a strange feeling by determining a target rotation speed of the generator based on a target drive torque and a vehicle speed.

This invention, which relates to such a drive control device, aims to perform appropriate drive force control when the front wheels and rear wheels of a vehicle are driven by different motors, respectively.

In order to achieve above object, this invention provides a drive force control system for vehicles, comprising an engine, a generator connected to the engine, a front wheel drive motor and rear wheel drive motor which are supplied power from the generator, and a microprocessor. The microprocessor is programmed to compute a target drive force of the vehicle based on an accelerator depression amount and vehicle speed, compute a target front wheel drive force and a target rear wheel drive force by dividing the target vehicle drive force, compute a power required to drive the generator based on the target vehicle drive force, compute the target rotation speed of the generator based on the power required to drive the generator and vehicle speed, compute a target torque of the engine based on the power required to drive the generator and rotation speed of the generator, control the front wheel drive motor and rear wheel drive motor based on the target front wheel drive force and target rear wheel drive force, and control the engine and generator based on the target engine torque and target generator rotation speed.

The details as well as other features and advantages of this invention are set forth in the remainder of the specification and are shown in the accompanying drawings.

DESCRIPTION OF THE PREFERRED EMBODIMENTS

Figure 1:
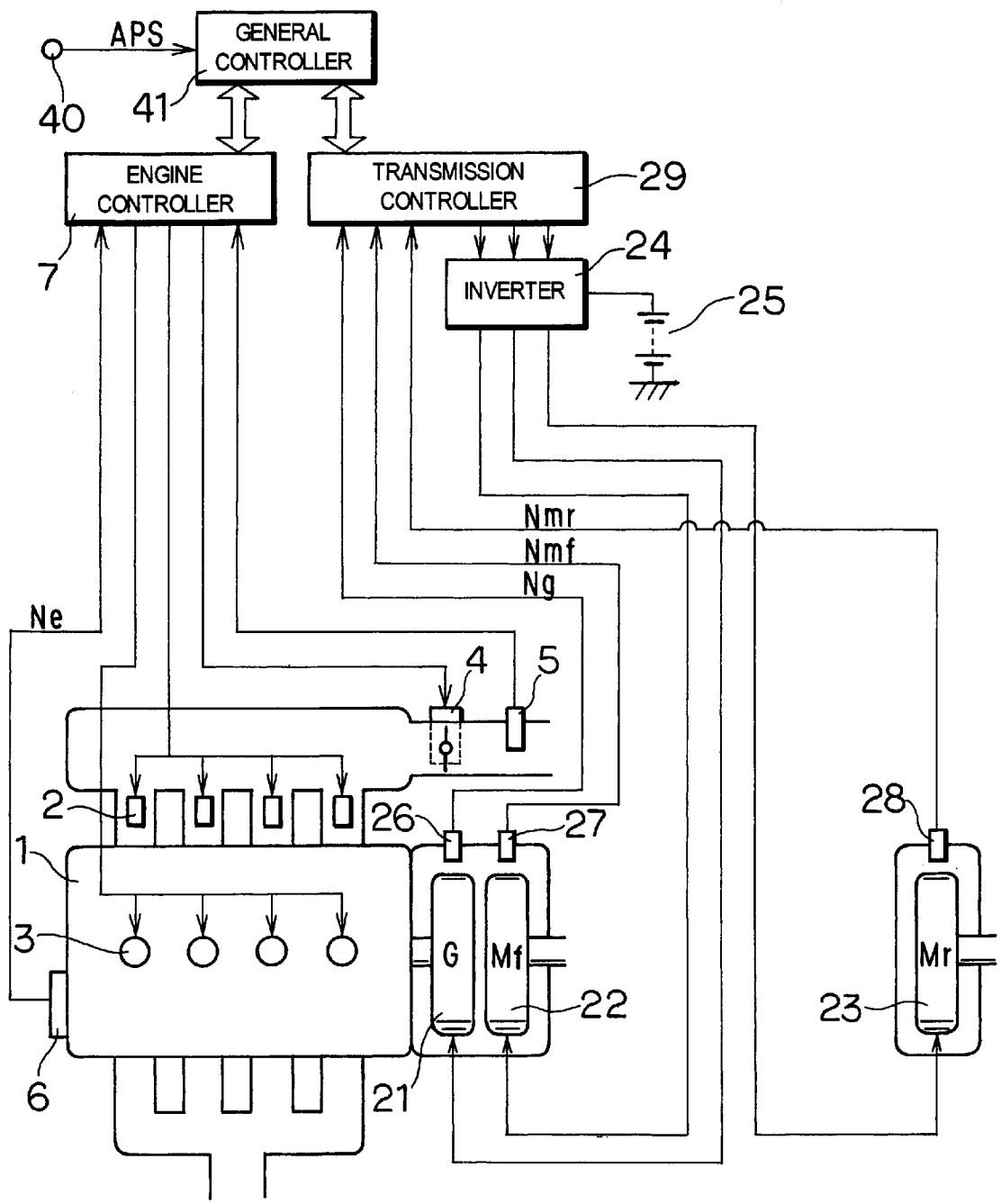
FIG. 1 is a schematic view of a vehicle provided with a drive force control device according to this invention.

Referring to FIG. 1 of the drawings, FIG. 1 shows the schematic construction of a vehicle equipped with a drive force control device according to this invention. In the figure, the numeral 1 indicates a 4-in-line gasoline engine, the numeral 2 indicates injectors which inject fuel into an intake air passage which branches to each cylinder of the engine 1, the numeral 3 indicates ignition plugs, and the numeral 4 indicates an electronically controlled throttle.

The throttle 4 controls the opening of an engine throttle valve according to a throttle opening signal from an engine controller 7 mentioned later. The numeral 5 indicates an air flow meter which detects an engine intake air amount, and the numeral 6 indicates a crank angle sensor which detects an engine rotation speed.

The engine controller 7 computes an intake air amount Qa based on the signal of the air flow meter 5, and computes the engine rotation speed Ne based on a signal from the crank angle sensor 6, respectively. The engine controller 7 also performs the following engine control based on these detected values and a target engine torque tTe computed by a general controller 41 mentioned later.

First, the engine controller 7 computes a target intake air amount which realizes tTe based on the target engine torque tTe and engine rotation speed Ne, and a throttle opening signal corresponding to this is sent to the throttle 4 (throttle control).

The engine controller 7 also computes a basic fuel injection amount Tp based on the intake air amount Qa and engine rotation speed Ne detected by the air flow meter 5 (Tp=K×Qa/Ne), and computes a final fuel injection amount by applying various compensations to this basic fuel injection amount Tp. A fuel injection timing is also computed based on the basic fuel injection amount Tp and engine rotation speed Ne. A fuel injection signal corresponding to this fuel injection amount and fuel injection timing is sent to the injectors 2 (fuel injection control). The engine controller 7 also computes an ignition timing based on the basic fuel injection amount Tp and engine rotation speed Ne, and sends a corresponding ignition signal to the ignition plugs 3 (ignition timing control). Hence, the engine torque Te is controlled to be the target engine torque tTe.

This invention assumes that the torque of the engine 1 can be controlled arbitrarily and in this embodiment, the torque of the engine 1 is controlled by adjusting the intake air amount of the engine 1. When this invention is applied to vehicles equipped with a diesel engine wherein the torque and intake air amount do not necessarily correspond, the fuel injection amount may be set according to the target engine torque tTe.

The numeral 21 indicates a generator which comprises a permanent magnet alternating current synchronous rotating machine. The rotor of the generator 21 is directly connected to the output shaft of the engine 1 without the interposition of the speed change mechanism. The generator 21 changes the output of the engine 1 into electric power.

The numerals 22 and 23 indicate a front wheel drive motor and rear wheel drive motor comprising permanent magnet alternating current synchronous rotating machine, respectively. The rotor of the front wheel drive motor 22 is connected with a front wheel shaft of the vehicle via a reduction gear mechanism, and is supplied with electric power generated by the generator 21 to drive the front wheels. The rotor of the rear wheel drive motor 23 is connected with a rear wheel shaft of the vehicle via a reduction gear mechanism, and is supplied with electric power generated by the generator 21 to drive the rear wheels.

The maximum output of the above-mentioned generator 21 is effectively equal to the sum of the maximum output of the front wheel drive motor 22, and the maximum output of the rear wheel drive motor 23. The ratio of the maximum output of the front wheel drive motor 22 and the maximum output of the rear wheel drive motor 23 is equal to the ratio of the front axle load and rear axle load in the vehicle stationary state.

The numeral 24 indicates an inverter. The inverter 24 sends a generator control signal which adjusts the rotation speed of the generator 21 to the generator 21 based on a rotating machine control signal from a transmission controller 29, and sends a motor control signal which adjusts the torque of the front wheel drive motor 22 and the rear drive motor 23 to the front wheel drive motor 22 and the rear wheel drive motor 23.

The numeral 25 indicates a battery. When a difference arises between the electric power generated by the generator 21, and the power consumption of the two motors 22 and 23, the battery 25 performs charge or discharge so that the difference is compensated. The battery 25 also supplies power to auxiliary equipment, such as an electric radiator fan and a fan for air-conditioning.

The numeral 26 indicates a generator rotation angle sensor. The generator rotation angle sensor 26 sends a signal according to a rotation angle phase (electrical angle phase) of the rotor of the generator 21 to the transmission controller 29.

The numerals 27 and 28 indicate a front wheel drive motor rotation angle sensor and a rear wheel drive motor rotation angle sensor, respectively. The rotation angle sensor 27 and 28 send a signal according to the rotation angle phase (electrical angle phase) of the rotor of the front wheel drive motor 22 and the rear wheel drive motor 23 to the transmission controller 29.

The transmission controller 29 computes a generator rotation speed Ng based on a signal from the generator rotation angle sensor 26, a front wheel drive motor rotation speed Nmf based on a signal from the front wheel drive motor rotation angle sensor 27, and the rear wheel drive motor rotation speed Nmr based on a signal from the rear drive motor rotation angle sensor 28, and sends them to the general controller 41. The transmission controller 29 also sends a rotating machine control signal generated based on the rotation angle phase signal from each sensor, a target generator rotation speed tNg, a target front wheel drive motor torque tTmf, and a target rear wheel motor torque tTmr to the inverter 24. Hence, the generator rotation speed Ng is controlled to be the target generator rotation speed tNg, the front wheel drive motor torque Tmf is controlled to be the target front wheel drive motor torque tTmf, and the rear wheel drive motor torque Tmr is controlled to be the target rear wheel motor torque tTmr.

The numeral 40 indicates an accelerator pedal depression amount sensor. The accelerator pedal depression amount sensor 40 sends a signal according to a vehicle operator's accelerator pedal depression amount to the general controller 41.

The general controller 41 performs the vehicle drive force control described below together with the engine controller 7 and the transmission controller 29. Each of these controllers 7, 29, 41 comprises a microprocessor, a memory for storing various programs and data, and input/output interfaces, The controllers can also be combined as one controller.

Figure 2:
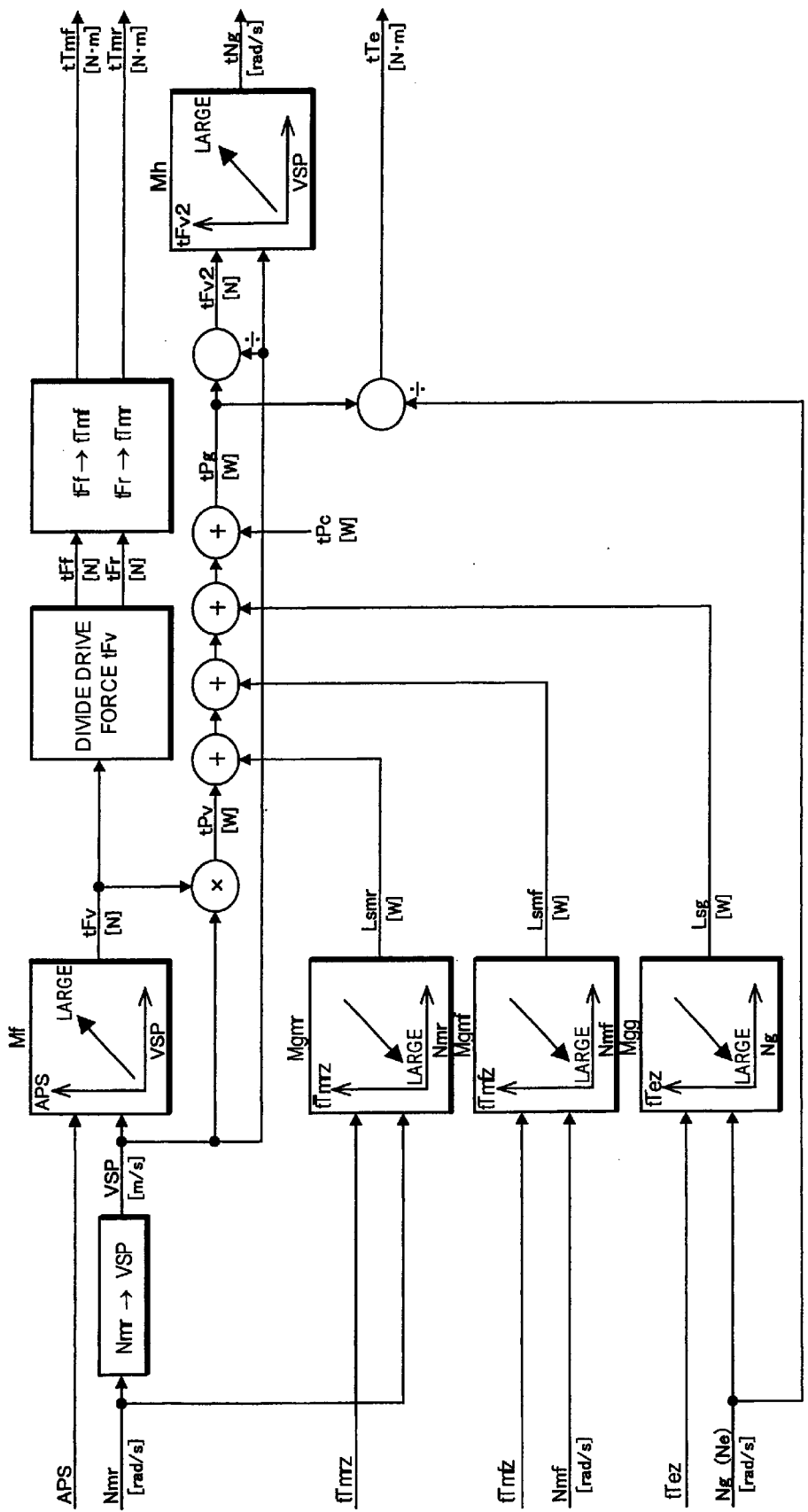
FIG. 2 is a conceptual diagram of a controller of the drive force control device.
Figure 3:
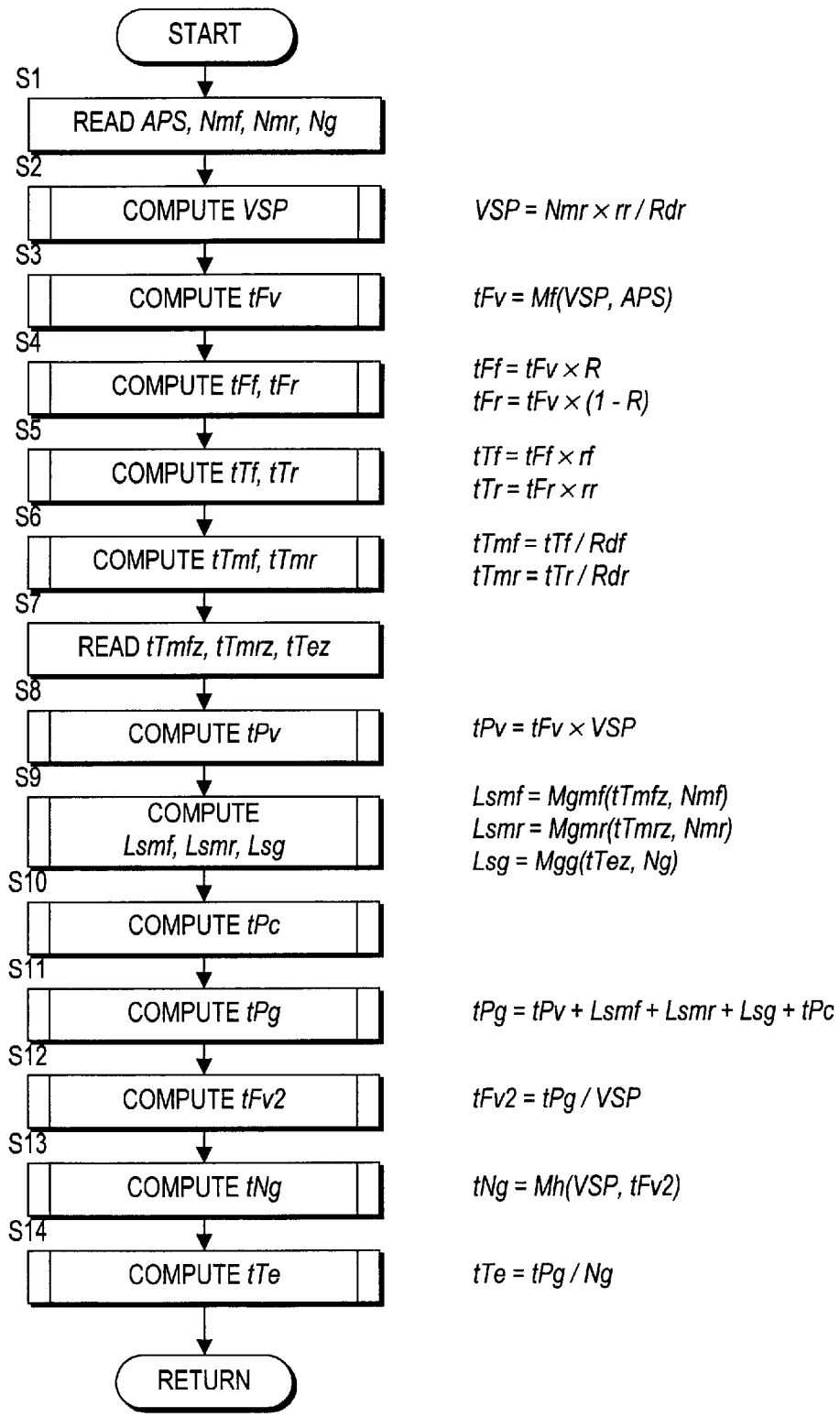
FIG. 3 is a flowchart showing the processing routine of drive force control.

FIG. 2 is a control block diagram of the drive force control performed by the general controller 41. FIG. 3 is a flowchart which shows a drive force control processing routine. This processing routine is performed by the controller 41 at a predetermined interval, e.g., 10 milliseconds. The drive force control of this embodiment will be described referring to the drawings below.

First, in a step S1, an accelerator pedal depression amount APS computed based on a signal from the accelerator depression amount sensor 40, generator rotation speed Ng [rad/sec], front wheel drive motor rotation speed Nmf [rad/sec] and rear wheel drive motor rotation speed Nmr [rad/sec] computed by the transmission controller 29, are read.

In a step S2, a vehicle speed VSP [m/sec] is computed by multiplying the rear wheel drive motor rotation speed Nmr [rad/sec] by the rear wheel radius rr [m], and dividing this by the reduction ratio Rdr of the reduction gear mechanism interposed between the rear wheel drive motor 23 and rear wheel drive shaft.

In step S3, a target vehicle drive force tFv [N] is computed based on the vehicle speed VSP [m/sec] and the accelerator pedal depression amount APS. This computation is performed by looking up values corresponding to VSP and APS from the control map Mf shown in FIG. 2.

In a step S4, the target vehicle drive force tFv [N] is divided into a front wheel part, and a rear wheel part. Specifically, the target front wheel drive force tFf [N] is computed by multiplying the target vehicle drive force tFv [N] by a division coefficient R ($0 \leq R \leq 1$), and the remainder is set as the target rear wheel drive force tFr [N] (tFr=tFv×(1−R)). The division coefficient R is a value obtained by dividing the front axle load by the vehicle weight. By dividing the target vehicle drive force using the division coefficient R, the front wheel and rear wheel can be driven by a drive force proportional to each axle load, and the running stability of the vehicle can be increased.

When the ratio of the target front wheel drive force tFf [N] and the target rear wheel drive force tFr [N] is made equal to the ratio of the front axle load and rear axle load, it is equivalent to making the ratio of the output of the front wheel drive motor 22 and the output of the rear wheel drive motor 23 equal to the ratio of the front axle load and rear axle load. Considering this, the ratio of the maximum outputs of the two motors 22, 23 is set as described above.

When the division coefficient R is set as a fixed value, it is set to be a value computed based on the front axle load in the vehicle stationary state. If it is considered that the ratio of the front axle load and rear axle load varies due to vehicle acceleration or deceleration, the level of this vehicle acceleration or deceleration is detected or computed, and the division coefficient R is corrected according to the degree of the acceleration/deceleration. For example, as the rear axle load increases when the vehicle is accelerating, the division coefficient R is made small so that the rear wheel drive force increases. Further, the degree of slip of the front and rear wheels may be detected based on a slip ratio, and the division coefficient R may be changed based on the degree of slip. For example, when the degree of slip of the front wheel becomes large, the division coefficient R is made small so that the front wheel drive force is reduced and the rear wheel drive force is increased.

In a step S5, the target front wheel shaft torque tTf [N·m] is computed by multiplying the target front wheel drive force tFf [N] by the front wheel radius rf [m], and the target rear wheel shaft torque tTr [N·m] is computed by multiplying the target rear wheel drive force tFr [N] by the rear wheel radius rr [m].

In a step S6, a target front drive motor torque tTmf [N·m] is computed by dividing a target front wheel shaft torque tTf [N·m] by a front wheel reduction ratio Rdf, and a target rear wheel drive motor torque ttmr [N·m], is computed by dividing a target rear wheel shaft torque tTr [N·m] by a rear wheel reduction ratio Rdr. The front wheel reduction ratio Rdf means the reduction ratio of the reducing gear mechanism interposed between the front wheel drive motor 22 and front wheel drive shaft, and the rear wheel reduction ratio Rdr means the reduction ratio of the reducing gear mechanism interposed between the rear drive motor 23 and rear wheel drive shaft.

In a step S7, the immediately preceding values tTmfz, tTmrz, and tTez of the target front wheel drive motor torque tTmf [N·m], target rear wheel drive motor torque tTmr [N·m] and target engine torque tTe [N·m] computed on the immediately preceding occasion the routine was performed, which are stored in the memory of the general controller 41, are read.

In a step S8, a target vehicle drive output tPv [W] is computed by multiplying the target vehicle drive force tFv [N] computed in the step S3 by the vehicle speed VSP [m/sec]. The drive force [N] is converted to a drive output [W] for simplifying the computation of a step S11 mentioned later.

In a step S9, a loss output Lsmf of the front wheel drive motor 22 [W] is computed based on the front wheel drive motor rotation speed Nmf [rad/sec] and the target front wheel drive motor torque tTmfz [N·m]. This computation is performed by looking up values corresponding to Nmf and tTmfz from a map Mgmf shown in FIG. 2. A loss output Lsmr [w] of the rear drive motor 23 is calculated by looking up values corresponding to Nmr and tTmrz from a map Mgmr shown in FIG. 2. The torque of the generator 21 is equal to the torque of the engine 1, so the loss output Lsg [w] of the generator 21 is calculated by looking up values corresponding to Ng and tTez from a map Mgg shown in FIG. 2.

In a step S10, a power tPc [W] required to charge the battery 25 is computed. As it is desirable that the charge amount of the battery 25 is always a predetermined amount (for example, 50% of the amount of the maximum charge), the power according to the difference of the actual charge amount and a predetermined target amount power is computed as the battery required power tPc [W].

In a step S11, a power tPg [W] required to drive the generator 21 is computed by adding the correction outputs (the three loss outputs Lsmf [W], Lsmr [W], Lsg [W] and the battery required power tPc [W]) to the target vehicle drive output tPv [W]. As they all have the dimension [W], this computation is a simple addition. If the generator 21 is driven by this generator required power tPg, a power obtained by subtracting Lsg from tPg will be generated. Of this power, tPc is used for charging the battery 25, and the remaining power will be supplied to the two motors 22, 23. The output after subtracting Lsmf and Lsmr from this power, which corresponds to tPv, is generated by the two motors 22, 23. As the engine 1 drives the generator 21, the generator required power tPg expresses the output which the engine 1 should generate.

In a step S12, a second target vehicle drive force tFv2 [N] is computed by dividing the generator required power tPg [W] by the vehicle speed VSP [m/sec].

In a step S13, the target generator rotation speed tNg [rad/sec] is computed based on the vehicle speed VSP [m/sec] and the second target vehicle drive force tFv2 [N]. This computation is performed by looking up values corresponding to VSP and tFv2 from the map Mh shown in FIG. 2. The map Mh is basically set so that the product of the efficiency of the engine 1 and the efficiency of the generator 21 becomes large, but in a range where this efficiency product is greater than a certain degree, it is set so that the target generator rotation speed tNg becomes low the lower the vehicle speed VSP becomes. A generator rotation speed (=engine rotation speed) which ensures good fuel cost performance and does not give the driver a strange feeling is thus obtained.

In a step S14, the target engine torque tTe [N·m] is computed by dividing the generator required power tPg [W] by the generator rotation speed Ng [rad/sec].

The drive force division of the step S4 will now be described in more detail.

If the output of the front wheel drive motor 22 is Pmf, the following equation (1) is deduced.

$$Pmf[W] = tTmf[N \cdot m] \times Nmf[\text{rad/sec}] \qquad (1)$$
$$= tFf[N] \times VSP[\text{m/sec}]$$

Likewise, if the output of the rear wheel drive motor 23 is Pmr, the following equation (2) is deduced.

$$Pmr[W] = tTmr[N \cdot m] \times Nmr[\text{rad/sec}] \qquad (2)$$
$$= tFr[N] \times VSP[\text{m/sec}]$$

The following equation (3) is deduced from equations (1) and (2).

$$Pmf/Pmr = tFf/tFr \qquad (3)$$
$$= R/(1-R)$$

Equation (3) shows that the ratio of the output Pmf of the front wheel drive motor 22 and the output Pmr of the rear wheel drive motor 23 are equal to the ratio of the front axle load and rear axle load. Moreover, as the ratio of the maximum output of the front wheel drive motor 22 and the maximum output of the rear wheel drive motor 23 is set equal to the ratio of the front axle load and rear axle load, if each maximum output is Pmfmax and Pmrmax, the following equation (4) is satisfied.

$$Pmfmax/Pmrmax = R/(1-R) \qquad (4)$$

The following equation (5) is deduced from Equation (3) and Equation (4).

$$Pmf/Pmfmax = Pmr/Pmrmax \qquad (5)$$

Generally, the efficiency of a motor becomes lower the more the vehicle is driven at a low output drive point, and is highest near the maximum output drive point. Equation (5) means that the ratio of the output of the two motors 22, 23 relative to their maximum output is always the same. Thus, the two motors 22, 23 can always be operated at almost equal efficiency.

The entire contents of Japanese Patent Application P2000-173576 (filed Jun. 9, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drive force control system for vehicles, comprising:
    an engine,
    a generator connected to the engine,
    a front wheel drive motor and rear wheel drive motor which are supplied power from the generator, and
    a microprocessor programmed to:
        compute a target drive force of the vehicle based on an accelerator depression amount and vehicle speed,
        compute a target front wheel drive force and a target rear wheel drive force by dividing the target vehicle drive force,
        compute a power required to drive the generator based on the target vehicle drive force,
        compute the target rotation speed of the generator based on the power required to drive the generator and vehicle speed,
        compute a target torque of the engine based on the power required to drive the generator and rotation speed of the generator,
        control the front wheel drive motor and rear wheel drive motor based on the target front wheel drive force and target rear wheel drive force, and
        control the engine and generator based on the target engine torque and target generator rotation speed.

2. A drive force control system as defined in claim 1, wherein the microprocessor is further programmed to:
    compute the power required to drive the generator by adding a correction output to a vehicle drive output obtained by multiplying the target vehicle drive force by the vehicle speed, and
    compute the target rotation speed of the generator based on a second target vehicle drive force obtained by dividing the power required to drive the generator by the vehicle speed, and the vehicle speed.

3. A drive force control system as defined in claim 2, wherein the correction output comprises any one of the loss output of the generator, the loss output of the front wheel drive motor, and the loss output of the rear wheel drive motor.

4. A drive force control system as defined in claim 2, wherein the correction output comprises a power required to charge a battery mounted on the vehicle.

5. A drive force control system as defined in claim 2, wherein the microprocessor is further programmed to compute the generator target rotation speed to be smaller the lower the vehicle speed becomes.

6. A drive force control system as defined in claim 1, wherein the microprocessor is further programmed to divide the target vehicle drive force so that the ratio of the target front wheel drive force and the target rear wheel drive force is equal to the ratio of the front axle load and rear axle load.

7. A drive force control system as defined in claim 6, wherein the microprocessor is further programmed to vary the ratio of the target front wheel drive force and the target rear wheel drive force according to the degree of acceleration of the vehicle.

8. A drive force control system as defined in claim 6, wherein the microprocessor is further programmed to vary the ratio of the target front wheel drive force and the target rear wheel drive force according to the degree of slip of the vehicle wheels.

9. A drive force control system as defined in claim 6, wherein the ratio of the maximum output of the front wheel drive motor and maximum output of the rear wheel drive motor is equal to the ratio of the front axle load and rear axle load.

10. A drive force control system for vehicles, comprising:
    an engine,
    a generator connected to the engine,
    a front wheel drive motor and rear wheel drive motor which are supplied power from the generator,
    means for computing a target drive force of the vehicle based on an accelerator depression amount and vehicle speed,
    means for computing a target front wheel drive force and a target rear wheel drive force by dividing the target vehicle drive force,
    means for computing a power required to drive the generator based on the target vehicle drive force,
    means for computing the target rotation speed of the generator based on the power required to drive the generator and vehicle speed,
    means for computing a target torque of the engine based on the power required to drive the generator and rotation speed of the generator,
    means for controlling the front wheel drive motor and rear wheel drive motor based on the target front wheel drive force and target rear wheel drive force, and
    means for controlling the engine and generator based on the target engine torque and target generator rotation speed.

* * * * *